INVENTOR.
ADOLPH RAZDOW
BY
ATTORNEY

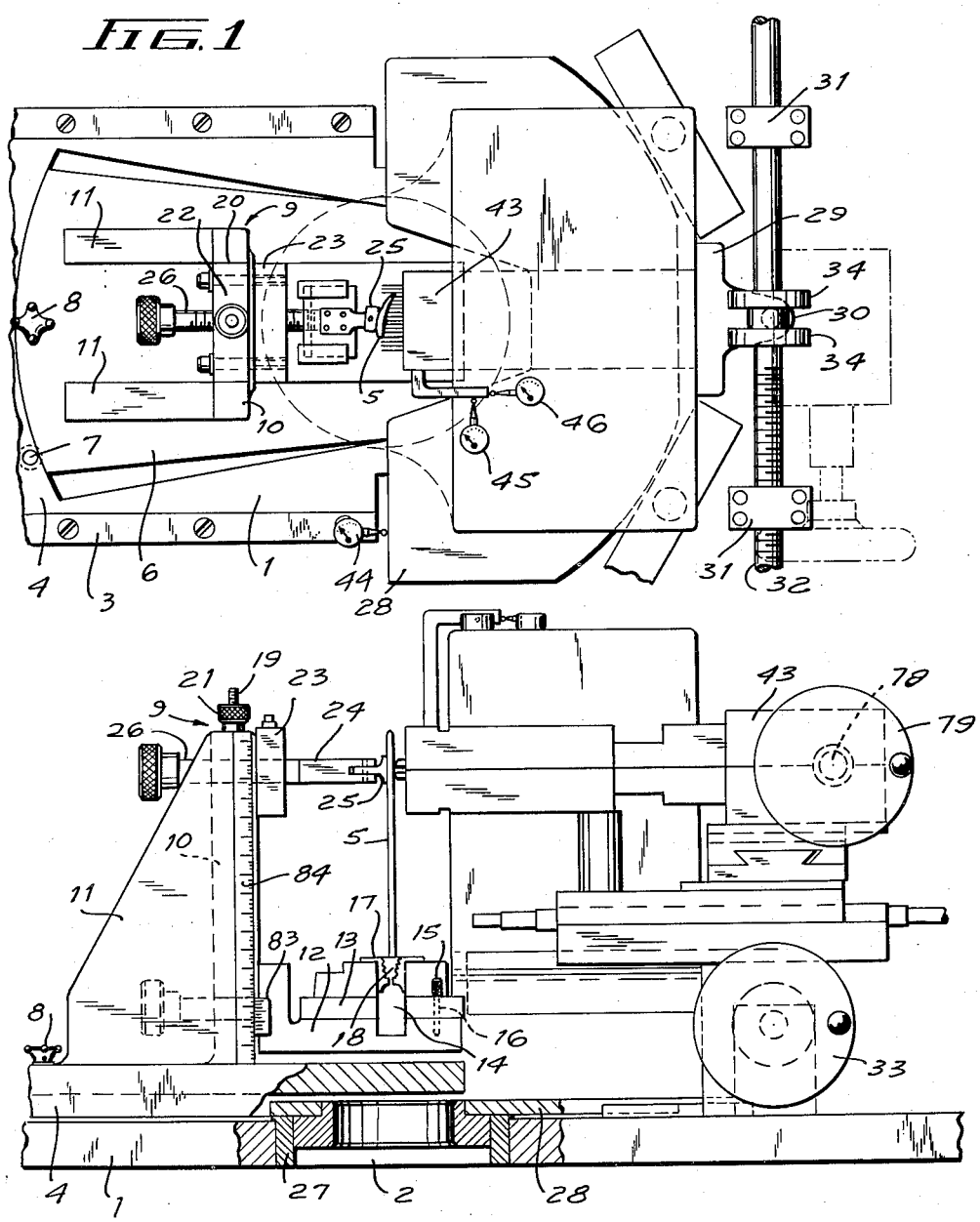

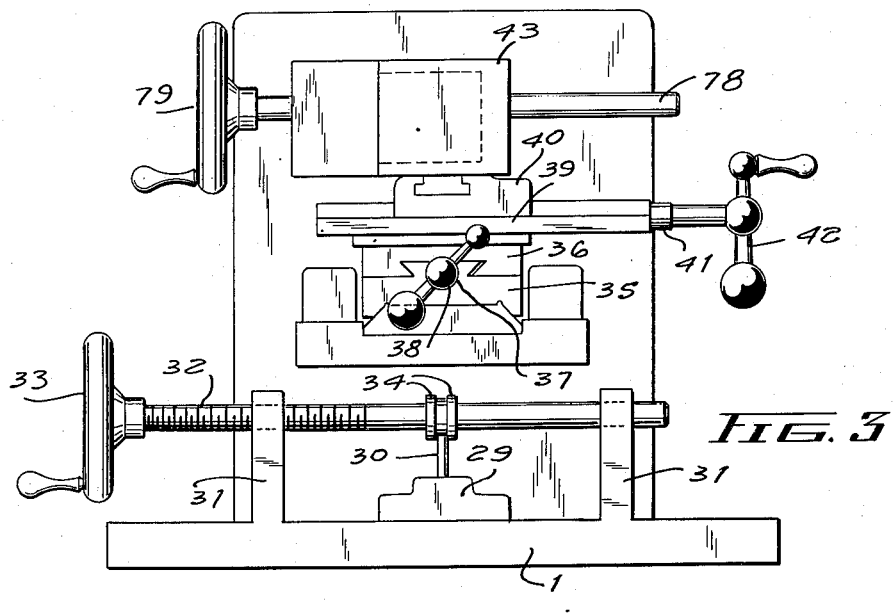
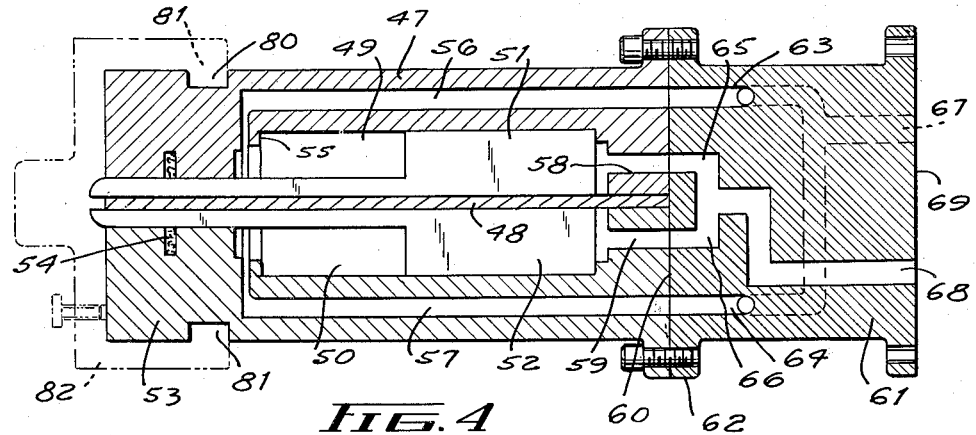
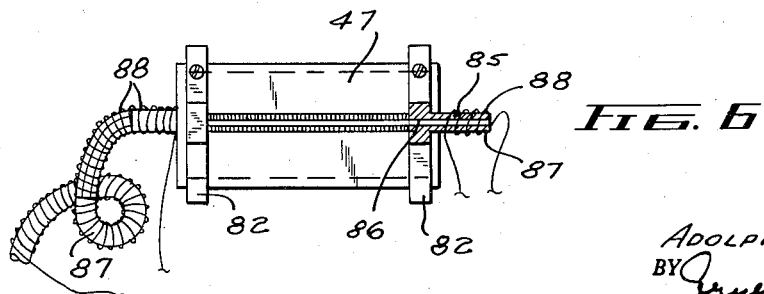
INVENTOR.
ADOLPH RAZDOW
ATTORNEY

INVENTOR.
ADOLPH RAZDOW
BY
ATTORNEY

Jan. 17, 1961 A. RAZDOW 2,968,074
APPARATUS FOR AND METHOD OF CONTROLLING OR
INSPECTING OF MEMBERS OR MECHANICAL PARTS
Filed Jan. 18, 1955 6 Sheets-Sheet 5
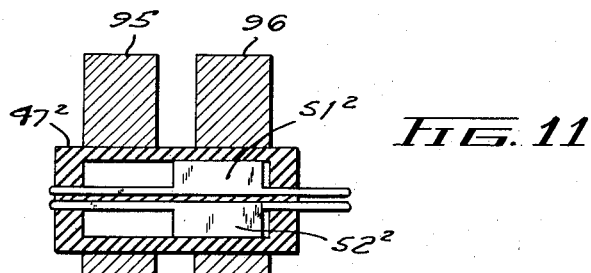
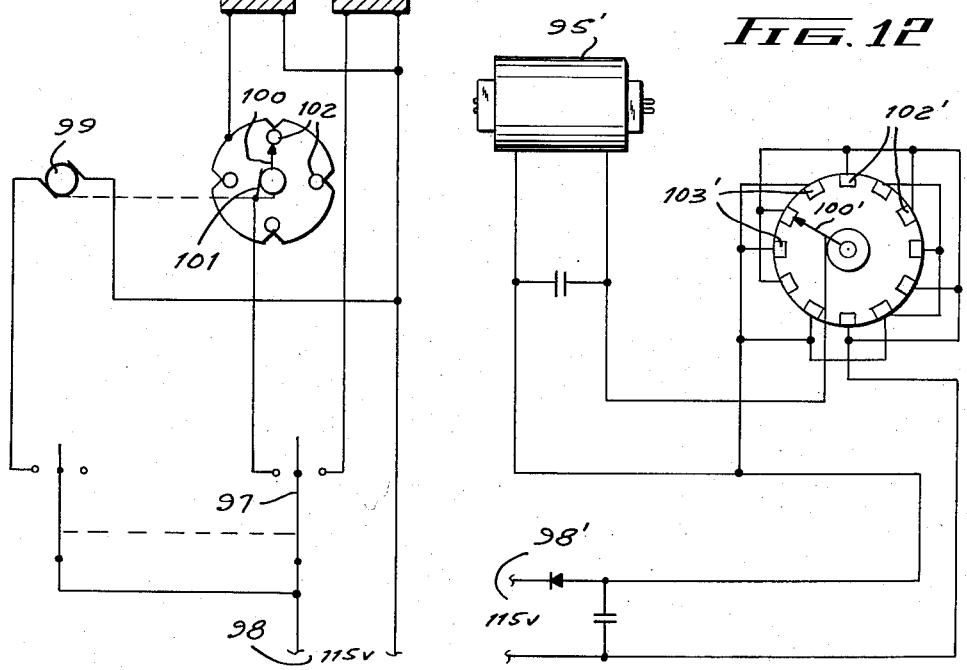
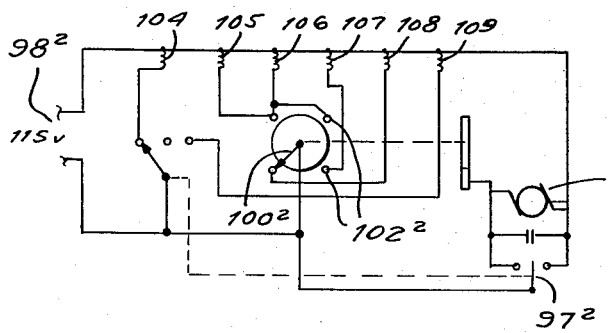
INVENTOR.
ADOLPH RAZDOW
BY
ATTORNEY Jan. 17, 1961  A. RAZDOW  2,968,074
APPARATUS FOR AND METHOD OF CONTROLLING OR
INSPECTING OF MEMBERS OR MECHANICAL PARTS
Filed Jan. 18, 1955  6 Sheets-Sheet 6
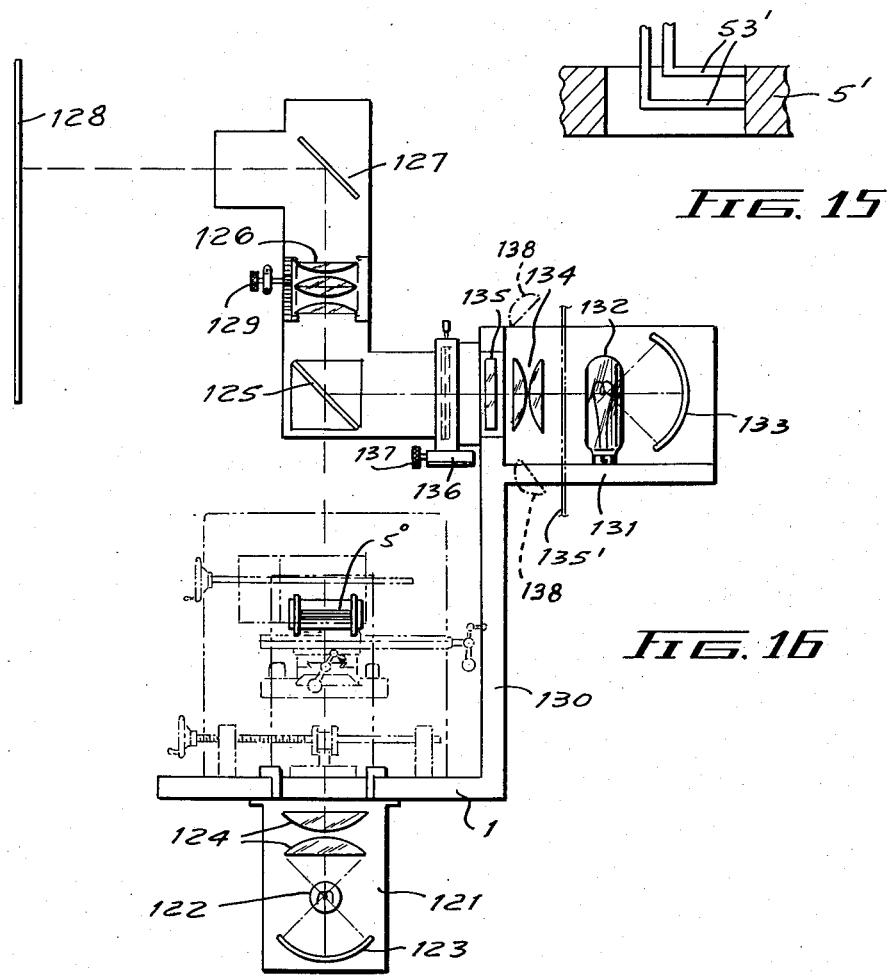
FIG. 15
FIG. 16
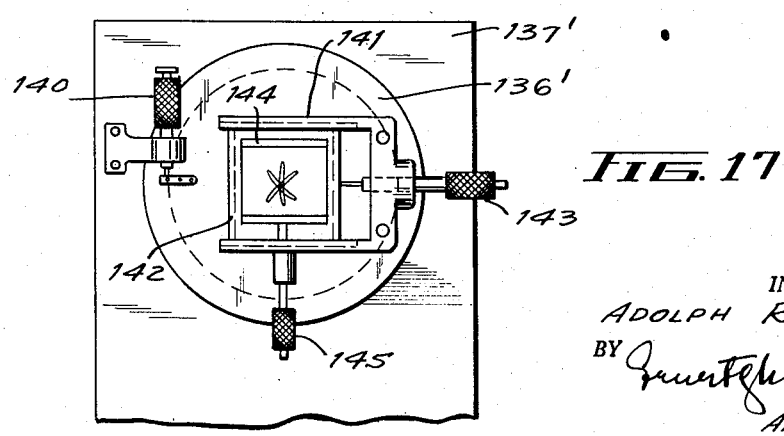
FIG. 17
INVENTOR.
ADOLPH RAZDOW
BY
ATTORNEY United States Patent Office 2,968,074
Patented Jan. 17, 1961

2,968,074
APPARATUS FOR AND METHOD OF CONTROLLING OR INSPECTING OF MEMBERS OR MECHANICAL PARTS

Adolph Razdow, 158 Montclair Ave., Montclair, N.J.

Filed Jan. 18, 1955, Ser. No. 482,565

10 Claims. (Cl. 22—57)

The present invention relates to an apparatus for and method of controlling or inspecting of members or mechanical parts in general and the cross section of such members or mechanical parts as blades and veins of compressors or turbines, in particular.

In applicant's copending application Serial No. 426,200, filed April 28, 1954, now Patent No. 2,795,995 an apparatus for and method of controlling or inspecting such members or mechanical parts has been disclosed. This apparatus provides already a workpiece holder for the member or mechanical part as for instance a blade and a plurality of fingers are disposed in a box, which fingers may be advanced in a predetermined plane towards the surface of the blade, and since two series of such fingers are provided spaced apart for a small distance, these fingers form a compartment into which liquid metal is fed to form a cast which reproduces the face of the workpiece, as for instance the blade, in the particularly given plane in which the thus formed compartment is disposed. Optical means are also provided to compare the end face of the formed cast with a reticle or master drawing and upon projection of the end face of the formed cast and of the reticle or of the master drawing on a screen at enlarged scale, any discrepancy between the required cross section of the blade and the cross section of the produced blade showing at the front face of the formed cast may easily be detected on the screen.

It must be realized that these blades have to possess twisted surfaces which are accurately calculated according to the laws of flow of the liquid or gaseous fluids, so as to obtain maximum efficiency from the blading and to prevent turbulence phenomena. These shapes or forms are difficult to design and difficult to construct in practice and the controlling of their production is rather complicated.

Realizing this problem, controlling or inspecting methods have been devised before, taking point by point the profile of the various transverse sections of the same blade and comparing the results of the measurements point by point with a theoretical tracing of the different sections. It is quite apparent that these procedures are very laborious. In order to overcome these difficulties it has been proposed before to provide an optical arrangement by forming an image of the apparent contour of the various sections of the member to be examined which is projected with magnification to a projection screen. Yet, these methods have not only been found cumbersome, but also insufficient for application in all situations where particularly complicated profiles had to be inspected.

It is, therefore, one object of the present invention to mount the object to be inspected on a support permitting a vertical as well as a rotary movement, in order to mount said object in any desired position, and to provide a box containing two series of fingers disposed in two different substantially horizontal planes spaced apart from each other with means for advancing each series of fingers towards the face of the blade to be inspected and also providing means for feeding molten metal into a compartment formed by the face of said blade and said two series of fingers to form a cast which is then subjected to a comparative optical inspection step by using a theoretical reticle or master drawing for comparison of any discrepancies in the formed surface of said blade.

It is another object of the present invention to mount such box which contains said two series of fingers in such manner that the box and thereby the two series of fingers may be subjected to longitudinal, crosswise and rotary movement, the latter to be performed about the longitudinal axis of said blade to be inspected and to provide means for reading such longitudinal crosswise or rotary movement preferably on indicators secured to the mounting in order to determine the amount of any discrepancy found between the profile of the formed cast and the master drawing.

It is also an object of the present invention to provide a method for inspection of particular cross sections of a workpiece as a blade by forming a cast of the cross section of said blade and comparing the face of said cast constituting a reproduction of said cross section of said blade with a master drawing by optical means.

With these and other objects in view, which will become apparent in the following detailed description, the present invention will be clearly understood in connection with the accompanying drawings, in which:

Figure 1 is a plan view of the apparatus for inspecting the cross section of a workpiece;

Fig. 2 is a front elevation thereof;

Fig. 3 is an end view thereof;

Fig. 4 is an axial section through the fingers containing box;

Fig. 6 is a front end view of the box shown in Fig. 4;

Fig. 11 is a diagrammatic view of one embodiment for electrically advancing and withdrawing, respectively, of the fingers;

Fig. 12 is a diagrammatic view of another embodiment of electrical operating means for advancing and withdrawing, respectively, of said fingers;

Fig. 13 is a third embodiment for electrically advancing and withdrawing, respectively, said fingers;

Fig. 15 is a schematic fragmentary view of a second embodiment of said fingers;

Fig. 16 is a schematic view indicating the optical means for comparison of the cast with a reticle; and Fig. 17 is an elevational view of the reticle mounting with indicating means for reading relative adjustment.

Figure 14:
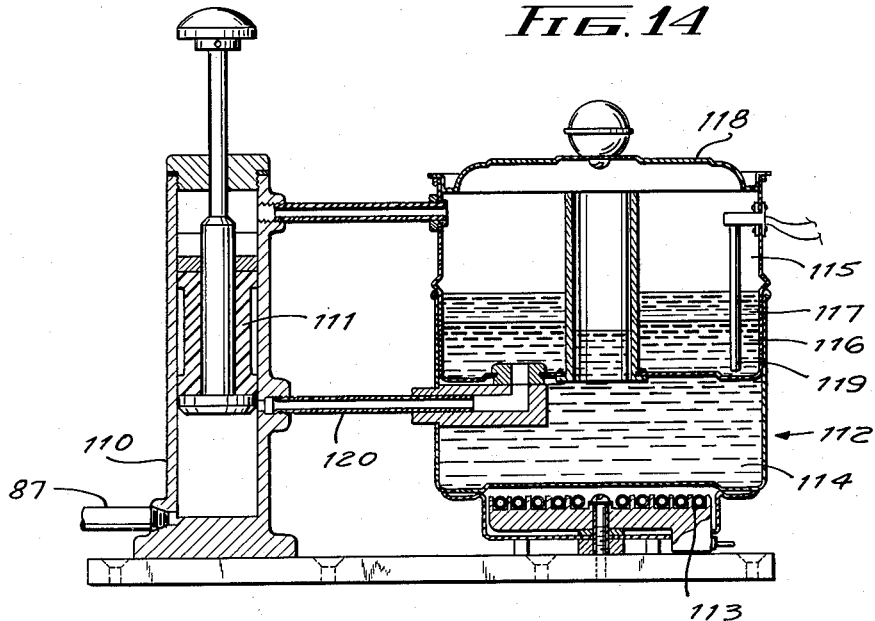
Fig. 14 is a section of the heating device for the metal to form a cast.
Figure 5:
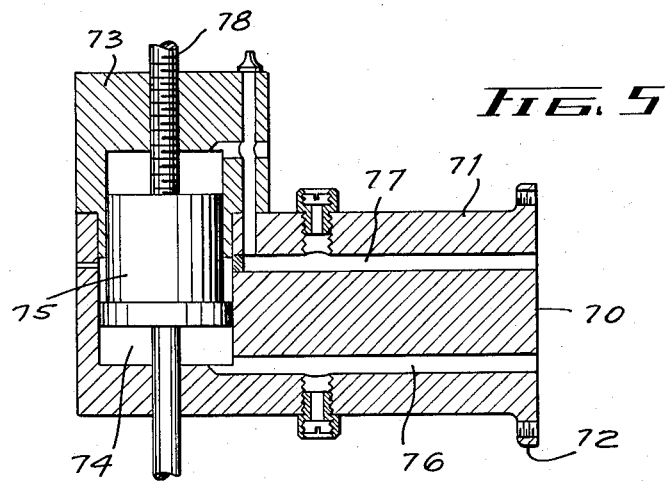
Fig. 5 is a cross section through the operating device for said fingers.
Figure 7:
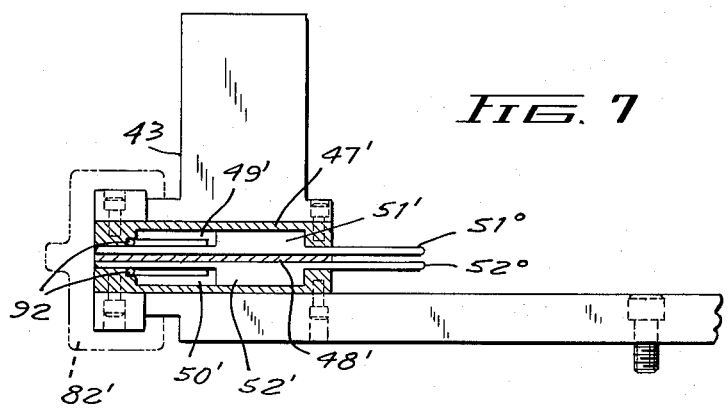
Fig. 7 is a cross section through the box shown in Fig. 4 mounted on its base and designed for manual operation.
Figure 8:
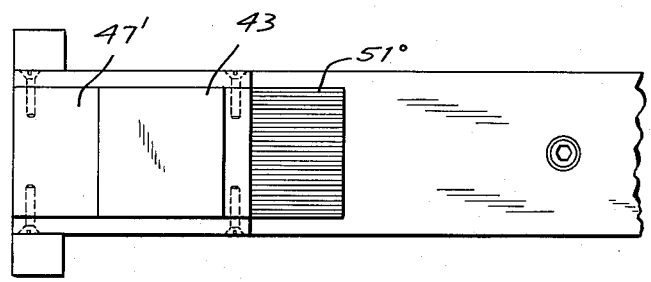
Fig. 8 is a top plan view of the device shown in Fig. 7.
Figure 9:
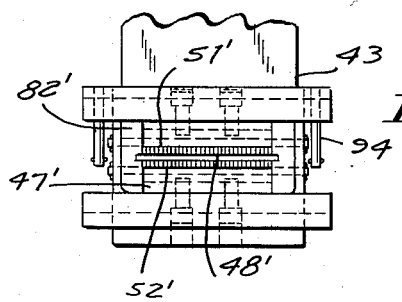
Fig. 9 is a front end view thereof.
Figure 10:
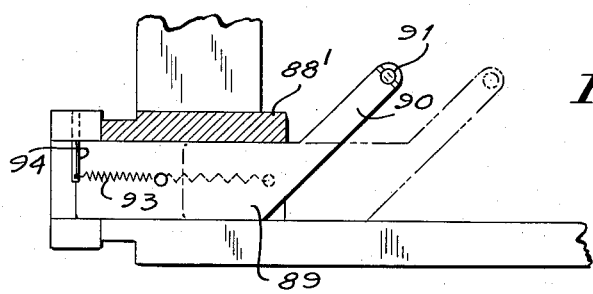
Fig. 10 is a fragmentary side elevation of the box indicating the manually operated means for withdrawing the fingers.

Referring now to the drawings and in particular to Figs. 1 to 10, the present apparatus comprises a horizontally disposed base 1 which is preferably equipped with a circular opening 2 for the purpose, as will be described later, to project a light beam towards any one of a plurality of casts to be formed with the present device. The base 1 carries two parallel disposed guide members 3 which are adapted to form a guide for a carriage 4 movable along the base 1 between the guide members 3. The carriage 4 is adapted to be moved forwardly into a position in which the opening 2 is covered up, in which position a turbine blade or another workpiece 5 is disposed in operative position, namely for forming the cast, and which carriage 4 may be withdrawn into inoperative position simultaneously with the workpiece 5 in which the opening 2 is freed to perform the optical testing step of the cast.

A turntable 6 is built into the carriage 4, which turntable 6 is preferably of sector-like shape and permits an angular displacement relative to the carriage 4 for a few degrees in each direction by means of an operating screw 7. A hand-operated screw 8 may be inserted into the carriage 4 in order to lock the latter in any desirable position on the base 1, though it is to be understood that any other securing means for the carriage 4 may be provided.

The carriage 4 has secured thereto and in particular mounted on the turntable 6 a bracket 9, which comprises an upright 10 having supporting walls 11. The upright 10 has a projection 12 on which a vise 13 is rotatably mounted upon a pivot 14, so that the vise 13 may be adjusted to different angular positions and may also be reversed, if necessary for about 180°. In order to set the vise 13 into a plurality of predetermined positions, the vise 13 is equipped with a lock pin 15 which may be inserted into one of a plurality of openings 16 provided on the top face of the projection 12.

The vise 13 receives two clamping members 17 which are adapted to receive the fir tree 18 or the end portion of any other workpiece 5 in order to clamp in predetermined, preferably vertical position.

The upright 10 has a vertical rod 19 disposed therein and forms guide faces 20 in which the projection 12 may slide upwardly and downwardly, respectively, by operation of an adjustment screw 21 for the rod 19. Thus, the projection 12 together with the vise 13 is mounted for vertical movement in the upright 10, and since the vise 13 is mounted on the projection 12, the vise 13 likewise performs this vertical movement. Near the upper end of the member 22 is provided a block 23 which carries a slide 24 to the forward end of which is pivotally mounted an abutment member 25 which is adapted to engage the face of the blade 5 opposite to that which is to be tested. A screw bolt 26 is also provided to adjust the abutment member in proper engaging position with the blade 5, the block 23 being rigidly secured to the upright 10.

The opening 2 in the base 1 is equipped with a bushing 27 and a second bracket 28 is supported by the base 1 in such manner that the bracket 28 may rotate upon the axis of said bushing 27. The bracket 28 is equipped with a projection 29 which carries a vertically disposed pin 30. Two bearings 31 are mounted on the base 1 adjacent to the bracket 28 which bearings are adapted to receive a partly threaded rod 32 which upon turning thereof by means of a hand-wheel 33 performs a movement in axial direction. The rod 32 has secured thereto two collar members 34 properly spaced apart to receive the upper end of the pin 30, so that upon turning of the rod 32 the bracket 28 performs a rotary movement upon the bushing 27 as pivotal axis. The upper face of the bracket 28 is formed to a dove-tail guide 35 on which a block 36 slides in longitudinal direction upon turning a threaded rod 37 by means of the wheel 38. The block 36 carries a crosswise disposed dove-tail guide 39 on which a second block 40 slides in crosswise direction by turning the rod 41 by means of the wheel 42. The block 40 supports a box 43 containing two series of parallel disposed fingers, as will be described below.

It is quite apparent that the present arrangement permits of adjustment of the box 43 by subjecting the same to a rotary longitudinal and crosswise movement relative to the base 1.

In order to permit the measuring of each one of the three mentioned adjustment movements, indicator means 44 are provided for reading the rotary movement, indicator means 45 for reading the crosswise movement and indicator means 46 for reading the longitudinal movement of the bracket 28 and of the box 43, respectively.

The box 43 comprises a hollow body 47 in which a flat plate 48 is horizontally disposed substantially at its center, thereby dividing the hollow body 47 into an upper compartment 49 and a lower compartment 50. Each of the compartments 49 and 50 is adapted to receive a plurality of blade-like fingers 51 and 52 and the rear end portion of each of the fingers 51 and 52 is of a height equivalent to that of the corresponding compartment, while the front portion of each of the fingers is appreciably reduced in height and projects through the front end 53 of the hollow body 47, in which also packing means 54 are disposed in order to permit appreciably high pressure in the hollow body 47. The rear face of each of the compartments 49 and 50 is set off to provide an abutment for the fingers 51 and 52 in their rearward movement, while a flange-like formation 55 is provided as abutment means for the forward movement of the fingers 51. The hollow body 47 is further equipped with an upper channel 56 and a lower channel 57, which lead to the front end of the respective compartments 49 and 50, and corresponding channels 58 and 59 are provided in the hollow body 47 leading to the rear portion of the hollow body 47. All four channels 56, 57, 58 and 59 terminate in the rear end face 60 of the hollow body 47.

A block 61 is secured by means of flanges 62 to the rear end face 60 of the hollow body 47 which have four channels 63, 64, 65 and 66 starting from the engaging end face of the block 61 in such manner that channel 63 amounts to a continuation of channel 56, channel 64 to a continuation of channel 57, channel 65 to a continuation of channel 58 and channel 66 to a continuation of channel 59. Channels 63 and 64 lead by cross-channels to a common channel 67 and in the same manner channels 65 and 66 lead by means of cross channels to a common channel 68, channels 67 and 68 terminating at the opposite end face 69 of the block 61.

The end face 69 of the block 61 is adapted to be engaged with the end face 70 of another block 71 (Fig. 5) by means of flanges 72 which block forms combine with a complementary block 73 a cylinder 74 in which a differential piston 75 is mounted for a reciprocating movement. Block 71 is equipped with one channel 76 which leads to the cylinder 74 on one side of the piston 75 and a second channel 77 which leads to the cylinder 74 on the other side of the piston 75. It is quite apparent that upon moving the piston 75 by means of the threaded rod 78 (Figs. 2 and 5), which may be operated by a hand wheel 79, that the pressure fluid contained in the cylinder 74 will be moved through the respective channels into the compartments 49 and 50 either in front or in the rear of the two series of fingers 51 and 52, respectively, and bring about either an advancement or a withdrawal of all fingers simultaneously in one single movement. The differential piston 75 is designed in such manner that one piston side is of greater diameter than the opposite side in order to maintain substantially equal pressure for both movements.

As it is clearly indicated in Fig. 4, the hollow body 47 has near its front end on its outer face two crosswise disposed grooves 80, which are preferably provided on the respective upper and lower faces thereof, which grooves are adapted to receive penetrating portions 81 of two U-shaped members 82. As is also clearly indicated in Fig. 6, the U-shaped members 82 perform a double purpose. One purpose to be achieved by the members 82 is to provide side walls for the compartment set for the forming of the cast, which is thus formed in a compartment having the bottom and top faces, respectively, of the two series of projecting fingers as top and bottom walls, respectively, the inner side walls of the members 82 as side walls, the face of the portion of the blade 5 to be tested as front wall and the front face of the plate 48 as rear wall. The cast to be formed will thus assume the shape of a thin plate the front face of which will be an exact reproduction of one predetermined horizontal zone of the blade 5. The members 82 may be adjusted crosswise to the required width of the cast to be formed, since the rear portions 81 thereof ride in the grooves 82 of the hollow body 47.

By operation of the adjustment screw 21 the vise 12 and, thereby, the blade 5 may be raised or lowered to any desired vertical position relative to the box 43. The blade 5 may thus be divided into a plurality of vertically spaced horizontal zones and by forming a cast for each of said zones the entire face of the blade 5 may be tested for accurate formation by comparing the cast of each zone with a reticle or master drawing, as will be set forth below. In order to determine the exact vertical position of the blade 5, the vise 13 has screwed thereon a vise-vernier 83 which may be read relative to a scale 84 mounted on the upright 10. It is also possible to provide a plurality of vertically spaced apart abutment members (not shown) on the upright 10 to which the vise 13 may be raised successively, in order to arrive at a plurality of zones of the blades 5 in each of which a cast is formed.

The second purpose of the members 82 is to function as feeding means for the molten metal into the compartment in which the cast is formed. In order to achieve this end at least one of the members 82 has a nozzle 85 which leads to a channel 86 in the member 82 which terminates in the compartment in which the cast is formed. Resilient tubing 87 is connected with the nozzle 85, which tubing is connected with the melting device for the metal.

It has been found that low melting alloys are the best material for giving superior results. The following examples are given now for such low melting alloys:

(1) An alloy consisting of 58% Bi and 42% Sn, known as "Cerro Low";

(2) An alloy consisting of 55.5% Bi and 44.5% Sn, known as "Cerro Base";

(3) An alloy consisting of 48% Bi, 28.5% Pb, 14.5% Sn, and 9% Sb, known as "Cerro Bond".

In order to maintain the alloy in its molten state, it is preferred to surround the tubing 87 with heating wire 88 which may be embedded in tape wound on the tubing 87.

The embodiment of the box 43 shown in Fig. 4 indicates hydraulic means for advancing and withdrawing the fingers 51 and 52 in the body 47, in which the fingers 51 and 52 may be considered as constituting pistons and the compartments 49 and 50 in the body 47 as cylinders, which pistons are moved in one or the other direction by corresponding movement of the differential piston 75 in the cylinder 74.

While hydraulically operating means serve the purpose in many instances, the pressure necessary for such operation may not be suitable if the workpiece is made of comparatively thin sheet metal. If the workpiece is made of material which does not stand up under pressure, it is, therefore, preferred to provide a finger box which is manually operated. Such box is disclosed in Figs. 7 to 10 of the drawings. The box 43 comprises again a hollow body 47' which is divided by the plate 48' into two compartments 49' and 50' which receive the respective series of fingers 51' and 52' reciprocating in the corresponding compartments 49' and 50'. In order to permit manual operation of the fingers 51' and 52', the latter are equipped with rearwardly extending projections 51° and 52° through the rear wall of the body 47'. All fingers 51' and 52' can now be pushed simultaneously by hand into an advanced position until their front ends engage the workpiece which is mounted on the vise 13 in the same manner as described before. Prior thereto the U-shaped members 82' have been moved crosswise until they engage the end faces of the workpiece. Special means are provided, as disclosed in Figs. 9 and 10, for withdrawal of all fingers into their original position. In order to bring about this result frame members 88' are provided at each side of the body 47' which form a guide for a slide 89 reciprocating in longitudinal direction along the body 47'. The slides 89 have at their rear end upwardly extending handle projections 90 which are connected by a rod 91. A cross-rod 92 is disposed in each of the compartments 49' and 50', which cross-rods 92 are secured to the slides 89 for simultaneous longitudinal movement. A spring 93, one end of which is secured to a pin 94 of the frame member 88 and the other end of which is secured to the slide 89 tends to hold the latter in its foremost position. Upon rearward movement of the slides 89, the cross-rods 92 engage the front faces of the high portions of the fingers 51' and 52' and return the latter into their rearward position upon forming the cast.

Referring now to Figs. 11 to 13, three variations of electrical means are disclosed for advancing and withdrawing, respectively, the fingers in the body. In accordance with the present invention, the hollow body $47^2$, in which the fingers $51^2$ and $52^2$ reciprocate, is surrounded by two solenoids 95 and 96. The hollow body $47^2$ is made of non-magnetic material while the fingers $51^2$ and $52^2$ are of magnetizable material, so that upon closing a circuit through one or the other solenoid the fingers $51^2$ and $52^2$ will advance or be withdrawn. A double switch 97 which may assume a momentary position closes a circuit from a power source 98 to a motor 99 which is mechanically coupled with a rotating contact member 100, to which current is fed in parallel arrangement over a brush 101. The contact member 100 engages during its rotation a plurality of terminals 102 which are in parallel in the circuit and each time the contact member 100 engages one of the terminals 102 the circuit through the solenoid 95 is closed and a pulse is sent therethrough. This arrangement brings about slow and stepwise advancement of the fingers $51^2$ and $52^2$ in order to avoid damage of the workpiece. In the other position of the switch 97 the solenoid 96 is permanently in the closed circuit and brings about fast withdrawal of all fingers $51^2$ and $52^2$.

In the variation of this arrangement disclosed in Fig. 12, a power source 98' is again connected with a solenoid 95' and a contact member 100' is rotated by a motor (not shown). In this case, however, one series of terminals 102' is in parallel to connect the power source 98' with the solenoid 95' each time the contact member 100' engages one of the series of terminals 102'. The fingers are advanced again stepwise by sending short pulses through the solenoid 95'. In order to retard the forward movement of the fingers, a second series of terminals 103' is provided which close the solenoid short each time the contact member 100' engages one of the second series of terminals 103', which results in a braking action for the fingers.

In the variation of this arrangement disclosed in Fig. 13, a power source $98^2$ is connected over a double switch $97^2$ again to a motor $99^2$ and in parallel to a contact member $100^2$ rotated by said motor $99^2$. A plurality of, preferably six, solenoids 104, 105, 106, 107, 108 and 109 are provided which surround the body (not shown) and the solenoid 104 is permanently in the circuit in one position of the switch $99^2$, while the solenoid 109 is permanently in the circuit in the other position of the switch $99^2$. The solenoids 105, 106, 107 and 108 disposed between the solenoids 104 and 109 are in the circuit successively only for short time intervals by receiving pulses upon rotation of the contact member $100^2$. One of the terminals $102^2$ is coordinated to each of the solenoids 105, 106, 107 and 108 so that these solenoids are energized successively in one direction in one position of the switch $97^2$, and in the other direction in the other position of the switch $97^2$ in which the rotation of the motor $99^2$ is reversed. Depending upon the direction of energization of the respective solenoids 105 to 108, the fingers are advanced or withdrawn, respectively. In order to advance the fingers the double switch 97² is set into one position which puts the solenoid 104 permanently and the solenoids 105, 106, 107 and 108 successively, yet in the order of 108, 107, 106 and 105, into the circuit, while in the other position of the switch the solenoid 109 is permanently in the circuit and the solenoids 105, 106, 107 and 108 successively in the same order namely 105, 106, 107 and 108 in the circuit.

The tubing 87 shown in Fig. 6 connects the members 82 with a cylinder 110 of the metal melting device which is disclosed in Fig. 14. The cylinder 110 has a reciprocating piston 111 and is connected with a vessel 112 which is equipped at its bottom with a heating element 113 adapted to heat water disposed in a lower chamber 114 of the vessel 112, while an upper chamber 115 is disposed above the lower chamber 114, which upper chamber 115 is adapted to receive metal 116 on top of which a layer of water 117 is provided to prevent oxidation of the metal 116. A cover 118 closes up the upper chamber 115. A thermostat 119 connected with the heating element 114 is disposed in the metal 116 to maintain a predetermined melting temperature for the metal 116. A conduit 120 leads from the upper metal containing chamber 115 to the cylinder 110 and upon moving the piston 111, the molten metal is fed through the tubing 87 to the cast forming compartment under predetermined pressure.

Referring now to Fig. 15, it is of course also possible to provide fingers which are not straight but which have front end portions 53' bent in any predetermined manner to engage a hollow workpiece 5'.

It is quite apparent that the forming of a cast is merely a preliminary step for the final comparison of the end face of the cast, which amounts to a reproduction of a section of the face of the workpiece, with a reticle or master drawing or phantom by optical means.

For this purpose the base 1 carries a housing 121 therebelow which contains a first light source 122, a spherical mirror 123 and condenser lenses 124. The housing 121 is connected to the bottom face of the base 1 by any suitable means and is open at its upper end. Since the housing 121 is just opposite the opening 2 of the base 1 and the optical axis coincides with the longitudinal axis of the workpiece 5, it is possible upon withdrawal of the workpiece 5, by moving the carriage 4 and thus exposing the end face of the formed casting 5°, to project the latter through a lens having a semitransparent mirror 125, an adjustable projector lens 126 and a mirror 127 onto a screen 128. Focussing means 129 are provided for the projector lens in order to render a sharp picture on the screen 128.

The base 1 has a bracket 130 which carries a second housing 131 containing a second light source 132, a spherical mirror 133, condenser lenses 134, a heat absorbing glass 135 and a reticle holder 136 with focussing adjusting means 137, so that the reticle may be likewise projected over the mirror 125, the projector lens 126 and the mirror 127 onto the screen 128. By comparison of the two projections on the screen 128, the slightest discrepancy between the reticle projection and the casting projection will be disclosed clearly particularly due to the enlargement on the screen.

It is also possible to provide a tracing, print or the like 135' which is subjected to the rays of a light source 138, and then projected onto the screen 128 through the mirror 125, projector lens 126 and mirror 127.

If any discrepancy is found on the screen 128 between the projection of the end face of the casting 5° and that of the reticle or tracing, print or the like, the bracket 28 may be adjusted by rotating, longitudinal or crosswise movement thereof, until the two projections on the screen 128 coincide completely. A reading on the indicator means 44, 45 and 46, respectively, renders the required information for the amount of required rectification on the tested zone of the workpiece 5.

Instead of adjusting the casting 5° with the adjustment means provided on the bracket 28, it is also possible to leave the casting 5° in its position and adjust the reticle until the two projections coincide on the screen 128. In order to achieve this end, the reticle holder 136' is rotatably mounted in a frame 139 and a microscrew 140 turns the reticle holder 136' relative to its frame 139, which screw 140 permits reading of the amount of rotation. The reticle holder 136' includes a U-shaped member 141 which provides guide means for a rectangular frame 142 which is longitudinally movable in the U-shaped member 141 by means of a microscrew 143. The rectangular frame 142 provides a guide to an inner frame 144 which is crosswise adjustable relative to the frame 142 by means of the microscrew 145. Both microscrews 143 and 145 permit reading of the required longitudinal and crosswise adjustment and the required rectification of the particular zone of the workpiece 5 may easily be determined.

It is quite clear that a testing of a workpiece face requires a division thereof into a plurality of zones and the forming of a casting for each of the zones, which is then compared by simultaneous projection with a reticle or phantom tracing and the required rectification may then be determined from the turning, longitudinal or crosswire adjustment movement of the bracket 28, that means of the casting 5° or as a variation of the reticle.

While I have disclosed several embodiments of the present invention, it is to be understood that these embodiments are given by example only and not in a limiting sense, the scope of the present invention being determined by the objects and the claims.

I claim:

1. In apparatus for forming castings of a plurality of cross-sections of a work piece, comprising a base, a first bracket mounted on said base, means for moving said first bracket on said base from a predetermined operative position into inoperative position, a vise means adapted to clamp a work piece therein and supported by said first bracket, means for vertical adjustment of said vise means relative to said first bracket, a second bracket disposed on said base opposite said first bracket, a box mounted on said second bracket, said box comprising a hollow body having an intermediate plate to form two compartments in said body, a plurality of fingers reciprocating in each of said compartments, said fingers in one of said compartments being spaced apart from said fingers in the other of said compartments and said fingers having projections extending beyond said body in operative position and disposed inside said body in inoperative position, the space between said fingers of the respective compartments defining a chamber for the castings to be formed, means for advancing and withdrawing, respectively, said fingers and means for feeding molten metal into said chamber.

2. The apparatus, as set forth in claim 1, which includes means for turning said vise means upon a vertical axis relative to said first bracket.

3. The apparatus, as set forth in claim 1, which includes means for turning said box upon the longitudinal axis of said work piece as pivotal axis, means for longitudinal movement of said box and means for cross-wise movement of said box relative to said second bracket.

4. The apparatus, as set forth in claim 1, in which the said means for advancing and withdrawing, respectively, said fingers comprises a hydraulic pressure source, and said box includes channels terminating in front of and behind, respectively, of said fingers, so that the feeding of pressure fluid in front of and behind said fingers results in advancing and withdrawal, respectively, of said fingers in said box.

5. The apparatus, as set forth in claim 1, in which said fingers have projections extending rearwardly from said box, so that manual engagement of the rear ends of said projections advances said fingers.

6. The apparatus, as set forth in claim 1, which includes a guide member disposed at each side of said box and a spring biased slide reciprocating in said guide member, a cross member engaging said fingers and carried by said slides, so that upon rearward movement of said slides said fingers are withdrawn.

7. The apparatus, as set forth in claim 1, in which said means for advancing and withdrawing, respectively, said fingers comprises at least two solenoids surrounding said box, a power source, and means for selectively energizing one of said solenoids.

8. The apparatus, as set forth in claim 7, in which said energizing means includes means for sending pulses into said solenoids in order to energize the latter for short time intervals.

9. The apparatus, as set forth in claim 8, which includes means for shortcircuiting said solenoids after each pulse, in order to brake down the speed of advancement of the fingers.

10. The apparatus, as set forth in claim 7, which includes a first and a last solenoid and a plurality of solenoids disposed between said first and last solenoids, all said solenoids surrounding said box, said first solenoid being permanently energized in one moving direction of said fingers and said last solenoid being permanently energized in the other moving direction of said fingers, and means for sending pulses successively in the line of order to said plurality of solenoids and means for changing the direction of order for the movement of said pulses.

References Cited in the file of this patent

UNITED STATES PATENTS

| Number | Name | Date |
|---|---|---|
| 447,132 | Hull | Feb. 24, 1891 |
| 447,187 | Hull | Feb. 24, 1891 |
| 450,521 | Milstelski | Apr. 14, 1891 |
| 1,371,458 | Wilson | Mar. 15, 1921 |
| 1,732,730 | Porter et al. | Oct. 22, 1929 |
| 1,812,369 | Porter et al. | June 30, 1931 |
| 2,155,248 | Adams | Apr. 18, 1939 |
| 2,381,634 | Back | Aug. 7, 1945 |
| 2,399,824 | Pressman | May 7, 1946 |
| 2,442,022 | Schulz | May 25, 1948 |
| 2,445,324 | Greenwell | July 20, 1948 |
| 2,795,995 | Razdow | June 18, 1957 |
| 2,835,942 | Razdow | May 27, 1958 |